March 8, 1949.　　　　　L. A. PATE　　　　　2,463,800
FILTER
Filed May 11, 1945
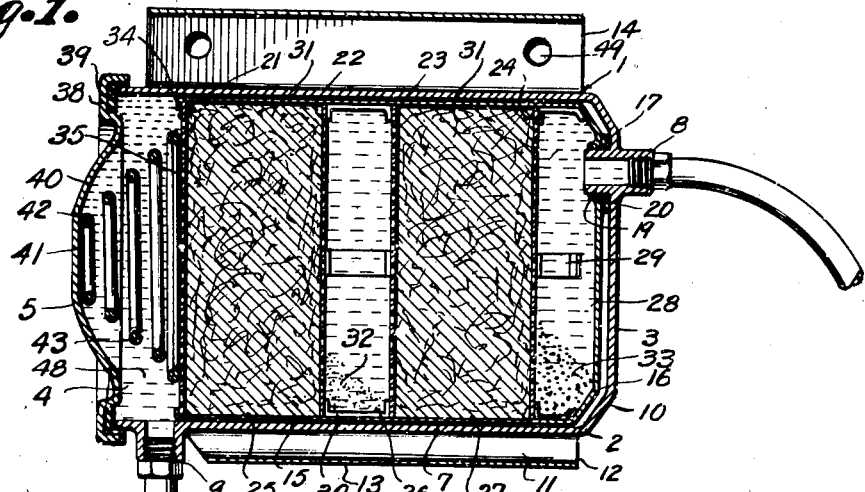
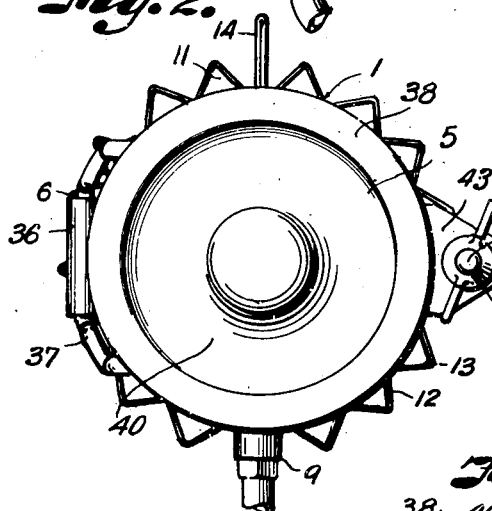
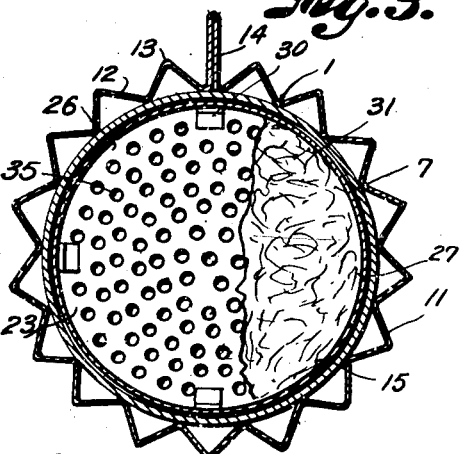
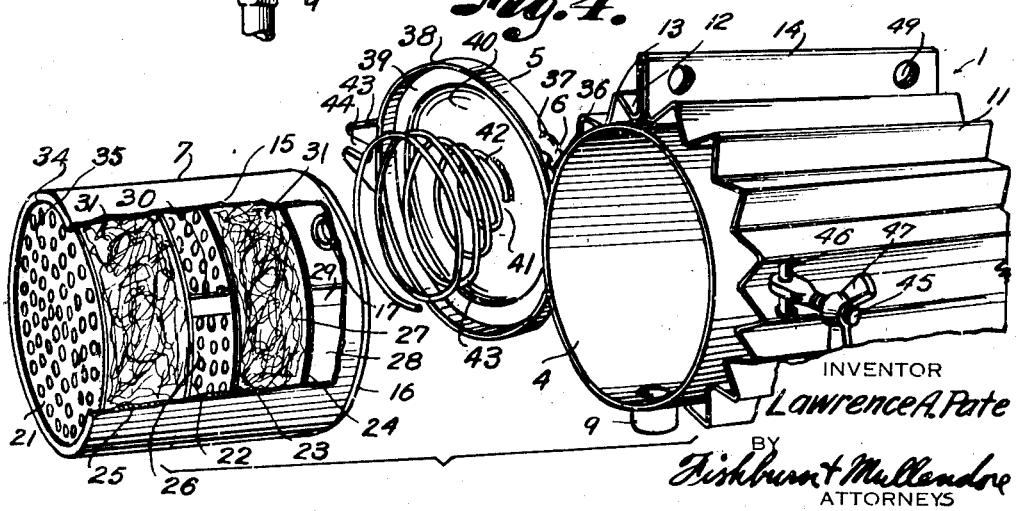
INVENTOR
*Lawrence A. Pate*
BY
*Fishburn + Mullendore*
ATTORNEYS Patented Mar. 8, 1949

2,463,800

UNITED STATES PATENT OFFICE 2,463,800

FILTER

Lawrence A. Pate, St. Joseph, Mo.

Application May 11, 1945, Serial No. 593,222

3 Claims. (Cl. 210—134)

This invention relates to filters of the type employed in the removal of impurities from oil used in lubricating automotive and other internal combustion engines in which the oil is forced through filters by pumping mechanism.

The principal object of the present invention is to provide a filter of this type having a removable core with which all sediment and impurities are removed when the core is withdrawn from the shell of the filter for replacement with a new core.

Other objects of the invention are to provide a device of this character having an extended cooling surface about the exterior of the shell over or through which air may pass for reducing temperature of the oil as the oil passes through the filter; to provide a filter adapted to be supported on its side with respect to the engine so that the core may be withdrawn horizontally from an end thereof; to provide a filter having a core comprising separate compartments for filtering media and one or more compartments for collection of sediment and impurities removed by the filtering media; to provide a core or cartridge for the filter having perforated partitions for the passage of oil therethrough from one filter media compartment to another; to provide for resiliently retaining the core in the casing in sealing relation with the oil inlet connection; and to provide a filter of simple and economical construction and which is efficient in operation.

In accomplishing these and other objects of the invention, I have provided improved structure, a preferred form of which is illustrated in the accompanying drawings, wherein:

Fig. 1 is a longitudinal cross section through a filter embodying the features of my invention.

Fig. 2 is an end view of the filter showing the hinged door through which the core is withdrawn for replacement by a new core when the filter is in use.

Fig. 3 is a transverse cross section through the filter with part of the perforated partition broken away to illustrate the filtering media at the back thereof.

Fig. 4 is a perspective view of the filter showing the door open and the core withdrawn from the shell, the wall of the core being broken away to illustrate the filter and sediment compartments therein.

Referring more in detail to the drawings:

I designates a filter embodying the features of my invention comprising a shell or housing 2 having a closed end 3, an open end 4, a cover for the open end 5 hingedly connected to one side of the housing, as indicated at 6, a core or cartridge 7 contained in the housing, and an inlet 8 and an outlet 9 for the passage of oil to and from the filter.

The housing 2 is preferably cylindrical in form and the end 3 has slightly beveled corners, indicated at 10, to provide a slightly dome shape to the end of the housing. Around the outer periphery of the housing I provide an extended cooling surface, preferably a plurality of ducts 11, through which air may pass to lower the temperature of the interior of the filter and thus cool the oil as it passes therethrough. While it will be obvious that various arrangements for cooling the filter may be provided, such as fins or the like, I preferably provide the ducts by crimping a strip of sheet metal or the like 12 to form corrugations or zigzag-shaped portions 13 providing substantially triangular-shaped ducts, which may be fastened to the outer periphery of the housing by spot welding or by crimping the sheet tightly therearound. The sheet material is first bent together at substantially the center thereof to form a flange 14 for fastening the filter in its place of use with respect to the engine or the like with which it is to be associated.

The core or cartridge 7 is also preferably cylindrical in form and includes a shell 15 having its inner end beveled, as indicated at 16, to conform to the rounded end of the housing 2. The inner end of the core shell is provided with an opening 17 having a flanged edge adapted to fit an inwardly extending end 19 of the oil inlet 8, a gasket ring 20 being inserted therebetween to prevent leakage. The core may be provided with any desired number of compartments, but I here show a series of partitions 21, 22, and 23 and an end 24 forming chambers 25, 26, 27, and 28 in the core. Spacers 29 are provided around the inner periphery of the core to hold the partition 24 away from the inner end of the core to provide the chamber 28, and spacers 30 are provided between the partitions 22 and 23 to provide the chamber 27 therebetween. Any suitable filter media 31 may be provided in the chambers 25 and 27, and the chambers 26 and 28 are adapted for the collection of sediment and impurities, as indicated at 32 and 33. The outer partition 21 of the core is held in place by inwardly crimping of the ends of the wall of the core, as indicated at 34, and all of the partitions have a plurality of perforations 35 for flow of oil therethrough.

The hinge for the cover 5 may be of any suitable type, but is here shown to consist of a sleeve 36 welded or otherwise secured to the housing 2 for receiving a formed rod or the like 37 secured to the cover by welding or other suitable manner.

The door 5 is shaped to form an annular channel 38 to contain a gasket ring 39 adapted to seat against the edge of the housing wall for preventing leakage of oil around the door. The cover is also preferably dome-shaped, as indicated at 40, and has a flat central portion 41 for seating the small end 42 of a cone-shaped spring 43 having its larger end seating against the partition 21 of the core for resiliently retaining the core in the housing 2 and to maintain a seal about the inlet when the door is closed. The door may be retained in closed position by any suitable manner, but I preferably provide fastening means consisting of an outwardly extending lug 43 on the cover having a slot 44 therein for receiving a toggle bolt 45 pivotally secured between the corrugations 13 on a pin 46. The toggle bolt has its outer end threaded to receive a wing nut 47 so that when the bolt enters the slot 44, tightening of the nut will hold the cover securely to the housing.

Operation of a device constructed and assembled as described is as follows:

Oil entering through the inlet 8 will pass to chamber 28 and a large part of the sediment and impurities will settle to the bottom of the chamber, as indicated at 33, for the reason that it cannot pass the filtering media in the compartment 27. The oil, however, will pass through the perforations in the partition 21, through the filtering material 31 in chamber 27, thence through the perforations in the partition 23 to chamber 26, and here any remaining sediment and impurities will settle to the bottom of the chamber, as indicated at 32. The oil filling up in chamber 26 will pass through the perforated partition 22, through filter medium in the chamber 25 to further remove impurities from the oil, and will pass out through the perforations 35 in the partition 21 of the core to chamber 48 formed between the end of the core and the door of the housing, and will then pass out through the outlet 9 to recirculate through the engine.

Crimping of the sheet material 12 to form the ducts 11 will create a larger heat exchange area to cool the oil as it passes through the filter.

The core or cartridge 7 may be removed at desired intervals by releasing of the door 5 and removing the core through the open end of the filter, after which a new core is placed therein.

I preferably anchor my filter on its side by fastening devices (not shown) which are passed through openings 49 in the flange 14. In this position all impurities will be removed with the core when the core is withdrawn.

It will be obvious that I have provided an improved filter wherein a core may be removed with the impurities therein and replaced with a new core and that I have provided means for cooling the oil as it passes through the filter, as above described.

What I claim and desire to secure by Letters Patent is:

1. In an oil filter, a housing having a closed and an open end and having an oil inlet in the closed end, a cover for said open end, a removable core in said housing having an imperforate end, imperforate side walls and a perforated end, the imperforate end being connected to said inlet for delivery of oil to said core, the perforated end of the core being spaced from the end of the housing forming an oil chamber, an oil outlet in said chamber, spaced perforated partitions in said core providing a sediment collecting chamber adjacent the oil inlet end of said core, filtering chambers in said core having filtering material therein, and a sediment collecting chamber between said filtering chambers.

2. In an oil filter, a housing having a closed and an open end and having an oil inlet in the closed end, and a cover for said open end, a removable core in said housing having an imperforate end, imperforate side walls and a perforated end, the imperforate end being connected to said inlet for delivery of oil to said core, the perforated end of said core being spaced from the end of the housing forming an oil chamber, an oil outlet in said chamber, spaced perforated partitions in said core providing a sediment collecting chamber adjacent the oil inlet end of said core, filtering chambers in said core having filtering material therein, a sediment collecting chamber between said filtering chambers, and a plurality of ducts around the outer periphery of the housing for passage of air therethrough for cooling the oil as it passes through the filter.

3. In an oil filter, a housing having a closed and an open end having an oil inlet in the closed end, a cover for said open end, a removable core in said housing having an imperforate end, imperforate side walls and a perforated end, the imperforate end being connected to said inlet for delivery of oil to said core, the perforated end of the core being spaced from the end of the housing forming an oil chamber, an oil outlet in said chamber, said core having perforated partitions providing separate chambers, filtering media in two of said chambers and the other chambers for collecting sediment from the oil as it passes through the core, means for resiliently retaining said core in said housing and means exteriorly of the housing for cooling the oil as it passes through the filter system.

LAWRENCE A. PATE.

REFERENCES CITED

The following references are of record in the file of this patent:

UNITED STATES PATENTS

| Number | Name | Date |
|---|---|---|
| 40,369 | Lussner | Oct. 20, 1863 |
| 136,364 | Conger | Mar. 4, 1873 |
| 1,514,979 | McMillin | Nov. 11, 1924 |
| 1,624,832 | Glover | Apr. 12, 1927 |
| 1,761,924 | Kamrath | June 3, 1930 |
| 1,963,945 | Lyman et al | June 19, 1934 |
| 2,158,512 | Layte et al | May 16, 1939 |
| 2,294,330 | Clark | Aug. 25, 1942 |
| 2,311,320 | Williams | Feb. 16, 1943 |
| 2,312,091 | Gray | Feb. 23, 1943 |
| 2,327,011 | Bolser | Aug. 17, 1943 |
| 2,388,668 | Carter | Nov. 13, 1945 |

FOREIGN PATENTS

| Number | Country | Date |
|---|---|---|
| 331,375 | Italy | Nov. 5, 1935 |